(12) United States Patent
Cuber et al.

(10) Patent No.: US 9,988,578 B2
(45) Date of Patent: Jun. 5, 2018

(54) METHOD OF FUEL FOR ENERGETICS PRODUCTION

(71) Applicant: HEDVIGA GROUP, A.S., Frydek, Frýdek-Mistek (CZ)

(72) Inventors: Petr Cuber, Havířov-Životice (CZ); Monika Pullmanová, Vratimov (CZ)

(73) Assignee: HEDVIGA GROUP, A.S., Frydek, Frýdek-Mistek (CZ)

( * ) Notice: Subject to any disclaimer, the term of this patent is extended or adjusted under 35 U.S.C. 154(b) by 259 days.

(21) Appl. No.: 14/914,559

(22) PCT Filed: Oct. 21, 2013

(86) PCT No.: PCT/CZ2013/000133
§ 371 (c)(1),
(2) Date: Feb. 25, 2016

(87) PCT Pub. No.: WO2015/032367
PCT Pub. Date: Mar. 12, 2015

(65) Prior Publication Data
US 2016/0200983 A1  Jul. 14, 2016

(30) Foreign Application Priority Data

Sep. 4, 2013 (CZ) .................................... 2013-677

(51) Int. Cl.
| | | |
|---|---|---|
| *C10B 47/46* | (2006.01) | |
| *C10B 47/10* | (2006.01) | |
| *C10B 47/14* | (2006.01) | |
| *C10K 1/04* | (2006.01) | |
| *C10B 47/06* | (2006.01) | |
| *C10B 53/07* | (2006.01) | |
| *F02B 43/08* | (2006.01) | |

(52) U.S. Cl.
CPC .............. *C10B 47/46* (2013.01); *C10B 47/06* (2013.01); *C10B 47/10* (2013.01); *C10B 47/14* (2013.01); *C10B 53/07* (2013.01); *C10K 1/04* (2013.01); *F02B 43/08* (2013.01); *Y02E 20/12* (2013.01); *Y02P 20/13* (2015.11); *Y02P 20/143* (2015.11)

(58) Field of Classification Search
CPC .......... C10B 47/10; C10B 47/14; C10B 47/46
See application file for complete search history.

(56) References Cited

FOREIGN PATENT DOCUMENTS

| | | |
|---|---|---|
| DE | 41 03 0738 A1 | 10/1991 |
| DE | 103 48 987 A1 | 5/2005 |
| DE | 20 2007 014636 U1 | 1/2008 |

OTHER PUBLICATIONS

English machine translation of DE 10 348 987, obtained from WIPO Jan. 5, 2018.*

(Continued)

*Primary Examiner* — Renee Robinson
(74) *Attorney, Agent, or Firm* — Notaro, Michalos & Zaccaria P.C.

(57) ABSTRACT

Pressure vessels containing a charge are preheated at pressure of 2 to 5 kPa with liquid heat carrier to maximally 120° C. They are afterheated in another place to maximally 550° C. The pressure vessels are continually added and/or replaced and generated gasses are continuously drawn off, cooled to maximally 60° C. and separated oily condensate. Residual gasses and solid residues are burned after treatment in a cogeneration unit.

11 Claims, 5 Drawing Sheets

(56) References Cited

OTHER PUBLICATIONS

International Preliminary Report on Patentability for PCT/CZ2013/000133 Filed on Oct. 21, 2013.
International Search Report for PCT/CZ2013/000133 filed on Oct. 21, 2013.
Wikipedia: "Torrefaction", URL:http://web.archive.org/web/20130617153118/http://en.wikipedia.org/wiki/Torrefaction Jun. 2013.
Reumerman et al: "Charcoal Production With Reduced Emissions", URL: http://www.cleanfuels.nl/Projects & publications/Charcoal Production with Reduced Emissions (paper).pdf Jan. 2002.

* cited by examiner

METHOD OF FUEL FOR ENERGETICS PRODUCTION

TECHNICAL FIELD

The invention relates to the method of processing of carbonaceous materials to produce fuels intended for use in power engineering.

BACKGROUND ART

Carbonaceous substances in solid, liquid as well as gaseous state are utilised as fuels for power engineering. In addition to well-known classical industrial fuels such as coke, oil, coal gas, etc. produced by traditional methods, fuels usable for power engineering are also acquired from various natural products, industrial waste, sorted household waste, sludge from sewage treatment plants, etc. Modern science and technology are increasingly concerned with issues of environmentally sound disposal of unwanted or waste materials and useful utilisation of carbonaceous sources contained there.

The usual way of processing of carbonaceous matters is thermolysis, i.e. thermal decomposition without combustion. Processed material is placed into a closed heated space such as a furnace chamber where it is subjected to high temperatures causing its decomposition and the gases being developed are discharged out from the heated space. Classic pyrolysis and other methods are involved. Gases discharged from the heated space are led through a heat exchanger or cooler, where they are subjected to cooling, which results in separation of water, if there is any, and oily condensate. The oily condensate is collected and further processed. Depending on the methods used and on collected fractions, it is utilisable directly or after further processing, especially as a lubricant and/or fuel. The gaseous medium remaining after separation of the condensate is led to devices serving for purification and concentration of utilisable gases and/or is used as fuel. Residual gaseous medium containing by now only nonutilizable waste products and possibly dust particles is led through filters into an exhaust pipe or chimney, or, in case of some methods and devices, it is led back to the heated space. Initial material based on organic residues, natural products, sludge, rubber, etc. is placed in a heated space in a container, trolley, on a sheet or other carrier, or is possibly fed on a grate positioned in the furnace chamber or other heating chamber. Material is preferably in a condition allowing good access of heat, i.e. in the form of chippings or particles obtained by grinding. Gases generated during the heating of material are changing their composition with increasing temperature of the material. First, ammonia and other volatile substances, water, inert gases, etc. are gradually released. It is known that gases with high content of hydrocarbons utilisable for power industry are released from these materials at temperatures varying with the initial material composition and pressure conditions. The principle of the process of thermal decomposition of these materials as well as the composition of fractions obtained by thermal decomposition depending on particular temperature and pressure of thermolysis is known. However, the problem is to achieve good economy of these thermal decomposition processes, i.e. the material heating mode, the amount of charge, the time of the material heat treatment, etc. The lack of optimal equipment is related to this as well. Heated chambers generally do not work continuously, it is necessary to cool them down before opening for each batch of raw material. Typically, the heating of heated space is stopped first and the heat is allowed to act for some time, then the space is allowed to cool naturally or it is artificially cooled. Gases may still leave the material after economic exhaustion of utilisable gaseous medium from processed material and during cooling, and therefore gases are usually drawn off even during this period, and then as the case may be, the still contained gases and/or swirling dust particles are drawn off after the space is sufficiently cooled to a safe temperature for opening. After the thermal process, usually only solid residue in the form of charred particles or of charred skeleton crumbling to rubble of coaly particles, whose prevailing component is carbon, remains from the initial batch of material in the workspace.

The abovementioned method is described for example in the patent application CZ PV 2010-586. Rubber waste is placed in a sealable chamber equipped with a heating element, cooling element, and a condensing circuit comprising a condenser. The rubber waste charge is in quantities from 0.1 to 0.9 of the volume of heated chamber. Subsequently, the chamber is closed and the temperature in the chamber is gradually increased to 350 to 400° C. without any specific modification of pressure conditions. Resulting gaseous products are led into a cooler where they partially condense and the condensate is collected in a separate tank. The cooled residual gaseous medium is led back into the chamber. After at least 40 minutes, but not before the rubber waste charge weight decreases by more than 15%, the space of the chamber is cooled to a temperature below 200° C. Subsequently, the chamber is opened and the resulting solid residue is removed. It consists of coke with residues of steel cord from tires. After removal of metal residues, this coke can be further utilised for example for heating. The device for implementation of the method comprises the chamber equipped with at least one heating element and cooling element, wherein the chamber is connected to the condensing circuit whose input and output is led into the chamber. The heating element consists of an electric heating spiral, which is due to the need to eliminate ignition of processed material placed in a protective housing and this unit is placed inside the heated chamber. There are for example four such heating elements inside the heated chamber according to the CZ PV 2010-586. From the outside, the chamber is provided with an insulating layer. In the abovementioned file, the pipe system of finned tubes placed in the heated chamber is described as the cooling element in the first example, and a partition wall situated on at least two sides of the chamber is described as the cooling element in the second example. Between the partition wall and the chamber wall, there is an air gap cooled by flowing air. Condensation circuit is equipped with a fan to provide circulation of gaseous medium from the chamber into the circuit and from the circuit back into the chamber, and it is furthermore equipped with a collecting vessel for condensate. The CZ PV 2010-586 describes the procedure for processing of worn down tires. Worn down tires are placed into the chamber in the quantity amounting to 60% of the chamber volume, and then the chamber is closed. The temperature in the chamber is gradually increased to 380° C. using the heating elements without special pressure adjustments. Resulting gases are led to the condensation circuit through which they circulate with the help of a fan and where condensate is created, collected and accumulated. After 40 minutes of thermal decomposition carried out in this way, the space of the chamber starts to cool down by supplying cooling medium into the cooling element. After cooling to 120° C., the chamber is opened and the resulting solid charred material residue is removed.

The disadvantage of the abovementioned method is that the gases developed during thermolysis are not processed by any other way than condensation. No utilisable combustible gas is extracted. Residual products contained in the chamber can escape into environment after opening the chamber. The method used and its thermal regime does not allow for sufficient decomposition of many raw materials. Repeated heating and cooling of the chamber separately for each batch of material is very uneconomical and results in large energy losses.

The document CZ U 21978 attempts to solve the abovementioned disadvantages of the said existing procedure. The heated chamber is equipped with an interchangeable mobile storage container, with the help of which the material intended for thermal decomposition is inserted into the heated chamber and removed from the chamber after the heat treatment. The mobile container is in the form of a mobile sealable body with a cover, which is equipped with a detachable inlet and outlet for gases generated by thermolysis. The said inlet and outlet are connected to the condensation circuit. The charge of material is gas-tightly separated from the heated chamber space by the cover. The procedure of material processing differs from the previous one in that the charge of material can be done into the hot chamber and the container with solid residues from thermal decomposition of the charge can be relocated out of the chamber while hot and allowed to cool outside the chamber on a suitable parking space, which significantly reduces the processing time for multiple charges in succession and also saves a lot of energy since shutdown and complete cooling down of the heated chamber are not necessary. The device and method described in this document already take into account also the option to disconnect the condensation circuit and divert the generated useful gas fractions for further utilisation and possible processing. The disadvantage is imperfect heat and pressure regime of decomposition, because it is impossible to set the optimum temperature curve of heating. Placing of material into the overheated-up chamber may cause undesired rapid development of gases leading to increased pressure in the system and as the case may be even to explosion, and also can give rise to a slag-like shell on the surface of the material, which prevents exit of generated gases. On the contrary, the chamber not heated up enough is rapidly cooled down with the newly inserted mobile container and thermal decomposition is inadequate. Sharp temperature fluctuations and distortions of the thermal process take place with each addition or removal of the mobile container into or out of the heated chamber. Even this device does not allow continuous process. The device is unable to generate utilisable gases in stable quantity and with stable composition. Possibility of connection of the device according to the CZ PV 2010-586 or the device according to the CZ U 21978 to a cogeneration unit is out the question also for the abovementioned reasons among others.

Document CZ U 21515 describes other device. The difference compared with the previous device is only in the fact that the gas pipeline for outlet of generated gasses is not emptying back into the heated chamber. A cooler with a receiver for condensate and with an outlet of residual gaseous exhausts out of the device is connected after the heated chamber. The mobile container used is only with a gas outlet, not with an inlet. Even in this case, the heated chamber of the device consists of a flameless furnace operating under normal atmospheric pressure, and also the mobile container operates likewise. The device operates similarly and has similar drawbacks as the previous one, with the difference that the residual gaseous medium is drawn off. The device operates only in a batch mode and therefore a sufficient quantity of gaseous and liquid products for the production of electricity and heat is not ensured. Another disadvantage is a problem with the purity and stability of directly manufactured gas when the gaseous fractions are released stepwise in the course of the thermal decomposition process of the charge with different material composition depending on increasing temperature, so that the composition of the gas produced varies with time. For use in a power unit however, it is necessary to use gas with a defined material composition that is constant within certain limits, so this device does not allow utilising the gas products as fuel in the energy unit. Due to temperature variations in the exhaust gas duct, its walls are frequently covered with the film of oleaginous substances from which these substances are subsequently partially released back into the gas, thereby polluting it. Also, the liquid product changes during the process of thermal decomposition of the charge both in quantity and quality, so that even the production of oily condensate cannot be used directly in the production as a fuel for a cogeneration unit or other combustion device.

Modern science also knows fast pyrolysis, for example the procedure and device that are described in the CZ Pat. 280 465 (with a priority from CA 90/2009021). Feedstock is heated up to a temperature of 350 to 800° C. with the lightning speed of 1,000 to 1,000,000° C./s, which is followed by a brief controlled dwell time, typically 30 ms to 2 s, and then rapid cooling of the product follows. Typically, the product is cooled rapidly below 350° C. within 0.5 s. Disadvantage of these processes is the need for expensive reactors, which are financially and spatially demanding. Configuration of these reactors is fundamentally different from the solved device, and therefore it will not be described herein.

DISCLOSURE OF THE INVENTION

The above-mentioned disadvantages are eliminated by the invention. New method of production of fuels for power engineering in which a carbonaceous material is processed by means of thermal decomposition without the presence of flame is solved.

The designed new method of production is dealing with the type of processing of material during which a charge of material is placed into a cavity inside a mobile container which is heated up in an appropriately heated space and an outlet with exhaust pipe for outlet of gasses generated by thermal decomposition is connected to the mobile container in at least some phase of thermal decomposition of the charge. Gasses generated from the charge are drawn off for further processing to for example liquid and gaseous fuel and a solid residue, for example carbonized particles utilizable as a fuel for power engineering, is left from the charge of material in the mobile container in the end. The essence of the new solution is as follows. The mobile container used is a pressure vessel with a gas outlet, which is closed after insertion of the charge, placed into a preheating unit and its gas outlet is connected to a gas pipeline present in this area of the device. Before and/or after the said connection, present air with contingent gases is exhausted from the pressure vessel through the gas outlet and in so doing, the pressure in the pressure vessel is decreased to 2 to 5 kPa. The pressure vessel in the state connected to the gas pipeline is preheated to the temperature of 90 to 120° C. This preheating is done within 60 to 120 minutes, optimally within approximately 90 minutes, and during this time period, pressure in the connected gas pipeline is maintained at 2 to 5 kPa and the gas mixture released by thermal decomposition of the charge in the pressure vessel is drawn off through the gas pipeline. Subsequently, the gas outlet is closed and disconnected, the closed pressure vessel is relocated to another area, an afterheating unit, where the space is heated up to higher temperature, but not higher than 550° C., and the gas pipeline is connected to its gas outlet also here, this gas outlet is opened and the pressure vessel is afterheated maximally for 180 minutes, while during this time period, pressure in the connected gas pipeline is maintained at 2 to 5 kPa and the gas mixture generated in the pressure vessel is drawn off through this gas pipeline.

Preferably the gases resulting from the charge are allowed to be freely released during preheating as well as during afterheating of the pressure vessel. At least the gases released in the stage of afterheating of the pressure vessel are preferably led out to a cooler, where they are cooled to a temperature of maximally 60° C., during which an oily condensate is separated. Uncondensed residual gas mixture with various fractions from thermal processing of the charge is also preferably collected in a storage space of the volume equal to four to six times the inner volume of the pressure vessel for the time period allowing these fractions to mix and thus to unify the material composition of the mixture to the required extent, for example it could be allowed to mix freely for at least 10 minutes without further heating. Then, provided that the contents of combustible components in the collected gas mixture amounts already to at least 20% vol. and a minimal heating value of at least 10 $MJ/m^3$ is reached, the gas mixture is led out of the storage space. The gas mixture is maintained at the same reduced pressure, i.e. 2 to 5 kPa, in the course of collection as well as its outlet.

Preferably the heated up spaces in all contained preheating as well as afterheating units, i.e. preheating units and afterheating units, are maintained in heated up state and the charge is put into at least two pressure vessels and these are heated stepwise, so that after removal of one pressure vessel, another pressure vessel is placed to its place.

The charge is preferably batched to the system of more than two pressure vessels, at least some of which are heated stepwise so that the removed pressure vessels are replaced with other pressure vessels with temperature and contents corresponding to the relevant step of the procedure. The system can consist of for example three to 50 pressure vessels according to the capacity and arrangement of the particular selected variant of the device.

Heating of the pressure vessel is preferably performed using a liquid heat carrier with which a space surrounding the pressure vessels during heating is at least partially filled, while in the case of afterheating, the pressure vessel is additionally heated also with the help of at least one additional heat source functioning on a different principle of heating, for example electric heating element or elements.

Preferably the liquid heat carrier preheating the pressure vessel is at least temporarily interconnected with the liquid heat carrier afterheating other pressure vessel at a different place in the device to a higher temperature. Using the said interconnection, a circulation circuit for circulation from the place of preheating to the place of afterheating is created and the liquid heat carrier is allowed to circulate at least temporarily through this circuit in the course of the process of heat treatment of the charge, while the flow rate through this circulation circuit is controlled as needed.

After an economic amount of generated gas mixture is drawn off the pressure vessel, the gas outlet of the afterheated pressure vessel is preferably closed, disconnected, and the pressure vessel is relocated back to the place of preheating, where it is allowed to transfer its heat back to the liquid heat carrier.

At the beginning of the process, at least one pressure vessel is placed into the liquid heat carrier and preferably next pressure vessels are stepwise additionally and/or alternatively placed here, while the generated gases are continuously drawn off. This is done in such quantity of pressure vessels and so long till the set quantity of the gas mixture is produced.

The liquid heat carrier used for heating of the pressure vessel or vessels is preferably a liquid based on oil, which is heated up to a temperature of 120 to 300° C. and held at this temperature for the period of continuous drawing off of the generated gases from the pressure vessels.

A heat exchanger is preferably connected to the part of the device containing the liquid heat carrier. The liquid heat carrier is allowed to flow at least temporarily through this heat exchanger as at least one of its work media, while the temperature of some of the media in the device is controlled using the heat gained or diverted from the liquid heat carrier by this heat exchanger. The control is performed so that the medium controlled in this way is led and allowed to flow through this heat exchanger as its second work medium.

The gas mixture produced is preferably compressed to the pressure of 2 to 20 000 kPa and in this state stored for further utilisation, and/or it is under the pressure of 2 to 5 kPa led out to be burned as a fuel, for example for a cogeneration unit.

The invention is suitable for production of fuels from various types of carbonaceous materials and their utilisation for power engineering purposes, especially for production of electric power and heat in the motors of cogeneration units with a gas and dual fuel system. The device can be made as a complete unit for processing as well as utilisation of waste raw materials, biomass, sludge, worn down tyres, various industrial residues etc. The invention allows economic utilisation of energies and heat without substantial losses and allows producing simultaneously solid, liquid and gaseous fuel from carbonaceous raw materials by means of slow thermal decomposition and also simultaneously utilising this fuel immediately for production of electric power and heat, is highly efficient. No contamination of environment accompanies its operation. The essential advantage is also the fact that the loading process of the material charge is discontinuous whereas the output in the form of produced gases and oily condensate, and/or in the form of operation of the cogeneration unit or, as the case may be, other combustion equipment, can be continuous for the time period specified by the operator.

REVIEW OF FIGURES ON DRAWINGS

The invention is illustrated using drawings, where.

EXAMPLE OF EMBODIMENT OF THE INVENTION

Example of embodiment of the invention is visually demonstrated with the help of the method according to the FIGS. 1 to 5 and the description mentioned below. Visual example of the device is demonstrated, and the method of production of fuels according to the invention as well as their utilisation in power engineering is visually demonstrated with the help of description of operation of this device.

The device demonstrated on figures is shown in the optimal complete arrangement for implementation of slow thermal decomposition of carbonaceous materials of various origin and composition.

Pivotal elements from the point of view of the invention are pressure vessels 1 creating fuel cells for charge and two heated units 2,3, which are adjusted each for different temperature. One of these is a preheating unit 2 and the other one is an afterheating unit 3. The preheating unit 2 is adjusted for preheating of the pressure vessels 1, the afterheating unit 3 is adjusted for afterheating of preheated pressure vessels 1 to a necessary higher temperature, as described in more details hereinafter. The pressure vessels 1 have cylindrical shape, one base of which is created by an arched bottom and the other one by a removable lid 4, with the help of which they are gas-tightly sealable. The lid 4 is equipped with heat insulation and at least one opening, through which a gas outlet 5 for outlet of primary combustibles is led out from the lid 4. The gas outlet 5 is equipped with valves 6 and is arranged with the option of disconnectable connection to a gas pipeline 7 for outlet of gases evolved by thermal decomposition of the charge. The preheating unit 2 and the afterheating unit 3 are created as chambers from tanks that are at least partially filled with liquid heat carrier 8. Several placing beds 9 for pressure vessels 1 are preferably created in each of these chambers. Each bed 9 is adapted in shape and dimensions for positioning of one pressure vessel 1. The beds 9 are created as storing pits corresponding with their shape and dimensions to the surface of that part of the pressure vessel 1 that is placed in them, and having on the top an admission hole for insertion of the pressure vessel body 1 and having inside a free space for the inserted body of the pressure vessel 1. At least part of them is created by a thin wall, for example metal sheet or membrane, of heat conducting material. For the sake of vivid description, the figures are only schematic and therefore the walls of the bed 9 are shown as merging with the walls of the pressure vessel 1 on figures FIG. 2 to FIG. 4. The input opening as well as the wall of the bed 9 fit to the pressure vessel 1 with the lid 4. The liquid heat carrier 8 is situated outside the bed 9, considered in view of the pressure vessel 1 placed in the bed 9, so that staining of pressure vessels 1 with the hot heat carrier 8 will not happen. Alternatively the preheating unit 2 and/or the afterheating unit 3 can be in the form of simple oil bath without the beds 9 arranged in this way, which is however significantly less preferable embodiment. The construction described above allows to place the pressure vessel 1 into the corresponding heated unit 2,3 so that the lid 4 and the sealing surface on the upper edge of the pressure vessel 1 are accessible from the space located outside the heated units 2,3. This solution allows maintaining maximal extent of safety in the case of defects of the sealing surface so that in the case of gas leakages occurring during the process of thermal processing of the charge, these combustible gases are early detected and no accumulation of these gases inside the heated unit 2,3 takes place.

The afterheating unit 3 is equipped with additional heat sources, on the one hand with electric heating element 10 from spiral heating wire placed directly in the liquid heat carrier 8, and on the other hand with a fireclay ring 11 fitting all around the circumference of the pressure vessel 1 with built-in internal electric heating element 10 also consisting of spiral heating wire.

The preheating unit and the afterheating unit 2,3 have their liquid heat carrier 8 interconnected so that a circulation circuit is created. In the presented example, this interconnection is illustrated as interconnecting branches 12,13 running between the body created by the preheating unit 2 and the body created by the afterheating unit 3. The circulation circuit is equipped with control valves creating its valves 6 and a pump creating its drive unit 14. The pump is equipped with usual controls for starting and switching-off.

Figure 4:
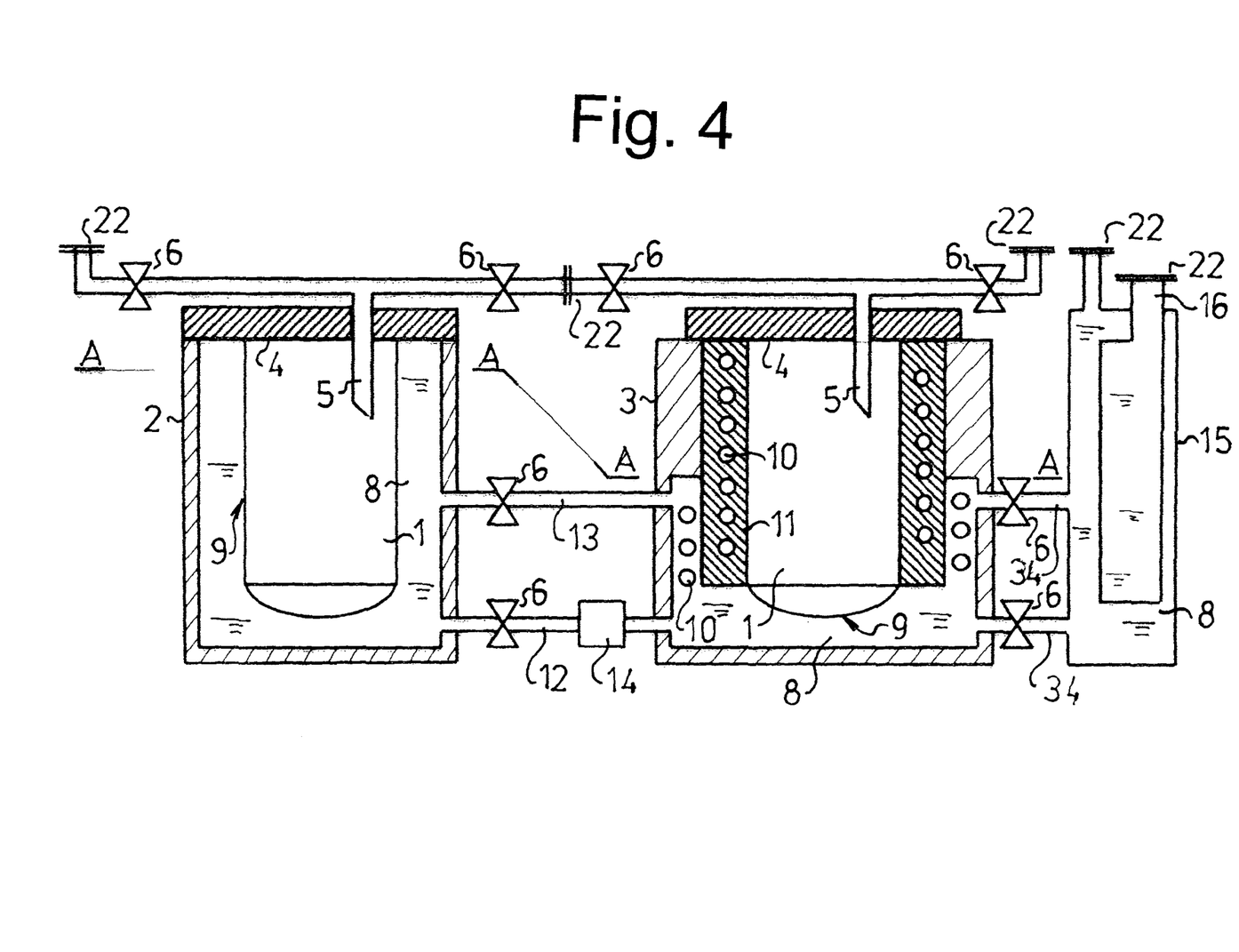
FIG. 4 shows side view on vertical section of the preheating unit and the afterheating unit with connected exchanger, FIG. 5 detail A, B shows a top plan view of the detail of the input part of the device with the preheating unit and the afterheating unit, where part A of the figure shows the principle of relocation of pressure vessels in time during thermal processing of the charge contained in them and part B shows connection of individual elements in the selected moment of the process of processing.
Figure 5:
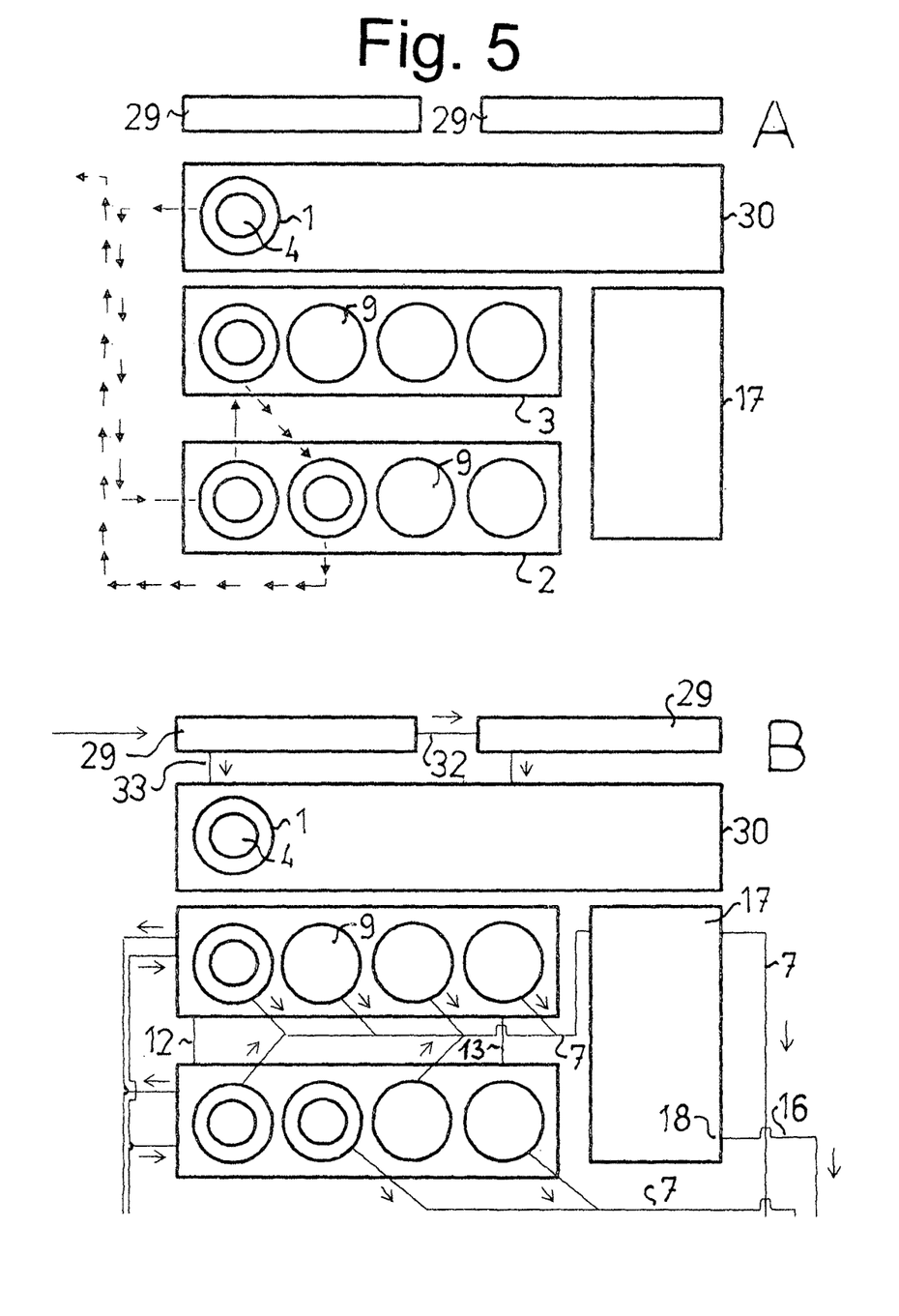

FIG. 4 shows alternative variant, in which a heat exchanger 15 is additionally connected to the liquid heat carrier 8. The liquid heat carrier 8 has a passage through the heat exchanger 15 created and creates its one work medium. The second work medium of the heat exchanger 15 is created by the selected medium from another part of the device, which allows utilising of heat transfer from/to the liquid heat carrier 8 for regulation of heat regime of some other or additional element in the work circuit of the device. FIG. 4 shows example variant in the case of connection of the heat exchanger 15 to the afterheating unit 3. The heat exchanger 15 can be preferably connected to a condensate pipeline 16.

Figure 1:
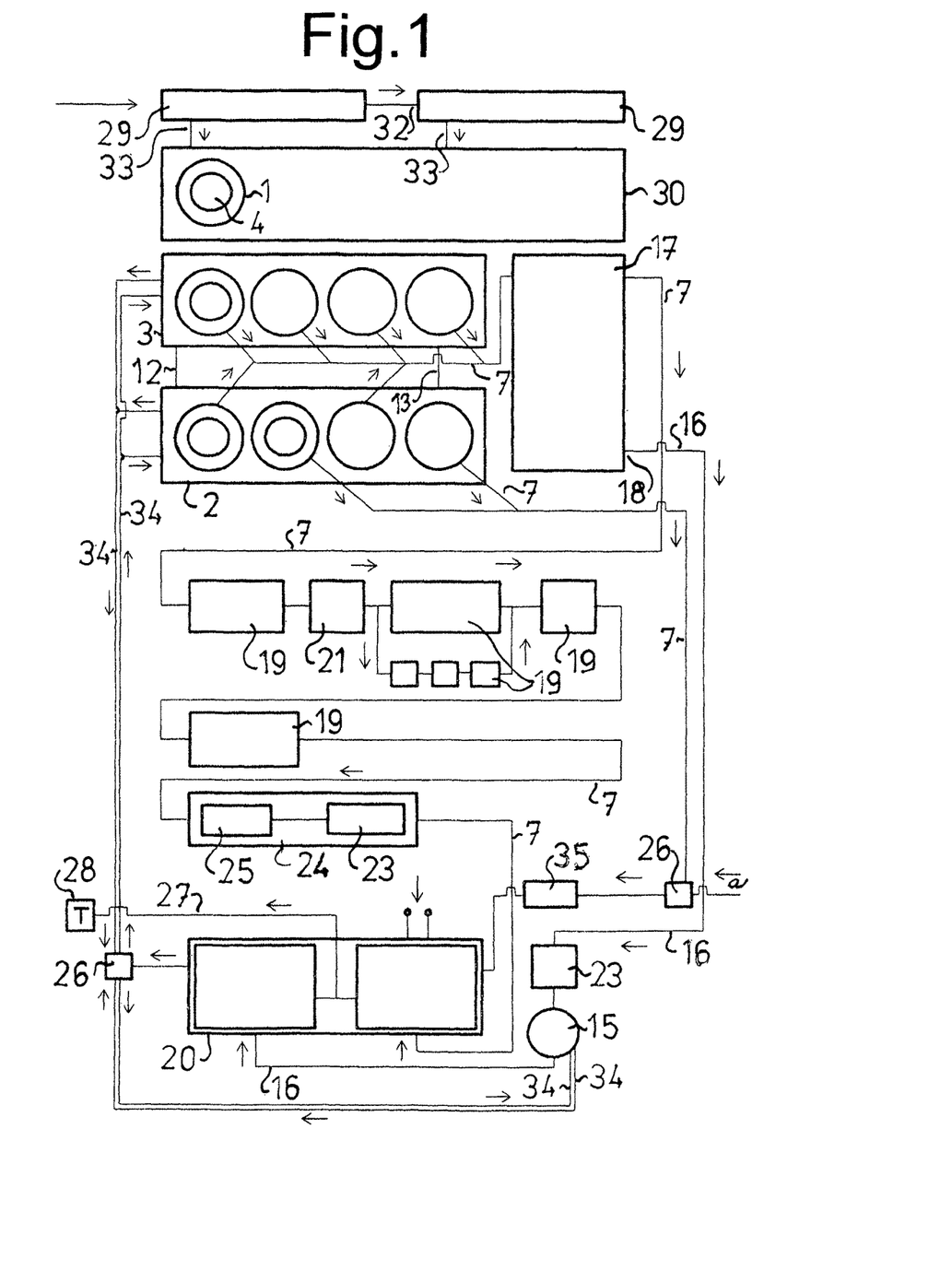
FIG. 1 shows schematic top plan view on the whole assembly of the device with the connected cogeneration unit.
Figure 2:
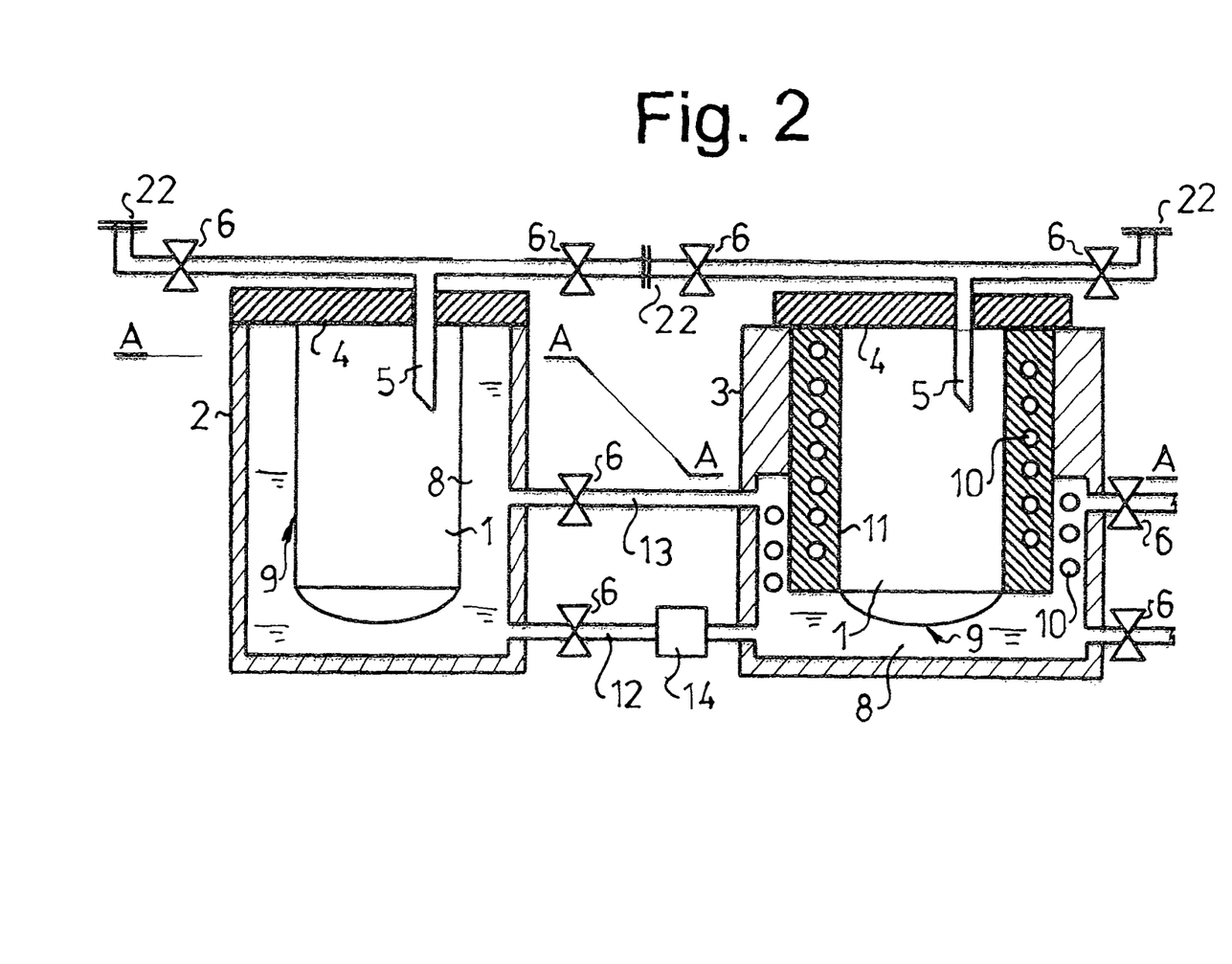
FIG. 2 shows side view on vertical section of the preheating unit and the afterheating unit.
Figure 3:
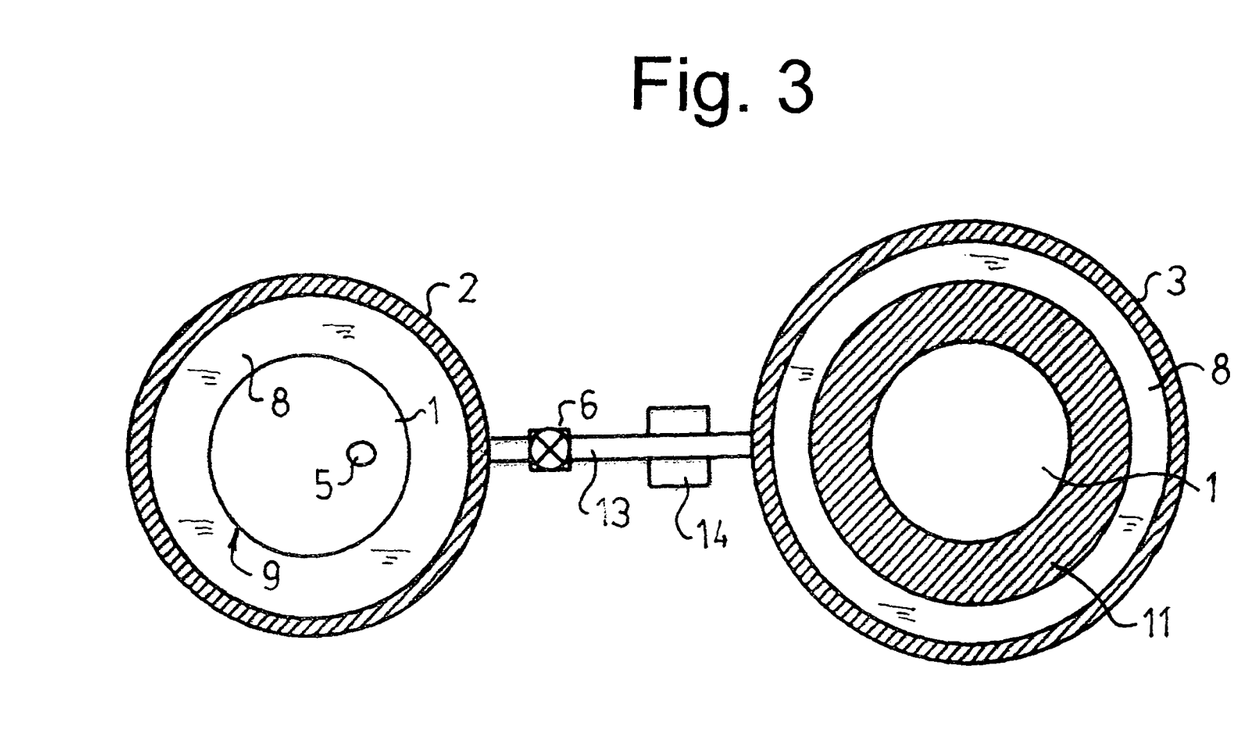
FIG. 3 shows cross-sectional view of the preheating unit and the afterheating unit when the section is drawn along the line A-A indicated on previous figure.

As shown in particular on the FIG. 1, the gas pipeline 7 is connected in the device after the preheating unit 2 and the afterheating unit 3 and led through the cooler 17. The cooler 17 can be equipped with a collecting vessel for resulting condensate. In the most advantageous embodiment, which is shown on FIG. 1, the cooler 17 has additionally or alternatively to a collecting vessel a condensate outlet 18, to which a condensate pipeline 16 is connected for output of oily condensate produced from gases drawn off. After passage through the cooler 17, the gas pipeline 7 continues further for uncondensed gases.

There is a set of gas tanks 19 of various capacities connected on the gas pipeline 7 after the cooler 17. The first gas tank 19 connected after the cooler 17 has the capacity of at least four times the inner volume of the pressure vessel 1.

The end of the gas pipeline 7 is leading to combustion equipment such as the cogeneration unit 20. Also the end of the condensate pipeline 16 is leading to the cogeneration unit 20.

The device is equipped with necessary measuring and regulating elements, controls, switches, and a control unit for automatic operation. Also a compressor 21 is included. The input part of the device can include elements for treatment and batching of input material. Significant disconnectedly mounted places in the device are shown as flanges 22 on FIGS. 2 to 4. The device is equipped also with necessary known elements for treatment of produced materials, connected on a suitable place of the circuit in the device such as filters 23, treatment plant 24 equipped with a drier 25, mixers 26, electric line 27, transformer 28. For the cogeneration unit 20, as usually during its operation, oxidizing air is additionally suctioned, which is marked with the letter a on FIG. 1 showing the whole work circuit of the device including the cogeneration unit 20. Also a water inflow is included. Usual elements for processing of feedstock such as mixing receivers 29, crusher 30, raw material conveyer 32 and hoppers 33 are also shown for completeness. Connecting elements of the heat exchanger 15 for the liquid heat carrier 8 are illustrated as liquid piping 34. Further, an intercooler 35 is included. The direction of media flow in the device during its operation is indicated with arrows.

Method of production of fuel for energetics according to the invention is clearly illustrated on the description of example of using the device for thermal decomposition of the matter from waste worn-out tyres. Carbonaceous material consisting of particles of chippings from tyres, or whole tyres including steel cords, is processed in the device by slow thermal decomposition without the presence of flame. The product is gaseous, liquid, and solid fuel. In the case of processing of whole tyres, the residue from the charge is in the form of carbonaceous particles with the remains of steel cords that must be removed from the fuel before combustion, but it is not necessary to dispose them—they can be for example handed over to a scrap-yard. In the case of complete circuit of the device according to the FIG. 1, produced fuels are also burned in the device, and at the same time, electric power and heat are produced and delivered to a consumer.

The input matter is obtained by crushing or grinding of rubber material from tyres. Charge consisting of particles of this material is dosed into the mobile containers created by the pressure vessels 1. The charge is inserted stepwise or all at once into several pressure vessels 1. After filling with the charge, each pressure vessel 1 is gas-tightly sealed with the lid 4. The gas outlet 5 is fixed to the lid 4 beforehand or after closing. The pressure vessel 1 is placed into the bed 9 in the preheating unit 2 and connected to the gas pipeline 7. Before and/or after the said connection, present air with contingent gases is exhausted from the pressure vessel 1 through the gas outlet 5 and in so doing, the pressure in the pressure vessel 1 is decreased to 2 to 5 kPa. The preheating unit 2 contains the liquid heat carrier 8 at warming-up temperature, maximum 120° C., for example oil or hot water. The pressure vessel 1 in the state connected to the gas pipeline 7 is preheated to the temperature of 90 to 120° C., where this preheating is done within 60 to 120 minutes, optimally within approximately 90 minutes. During this time period, pressure in the connected gas pipeline 7 is maintained with the help of compressor 21 at 2 to 5 kPa, and the gas mixture released by thermal decomposition of the charge in the pressure vessel 1 is drawn off through the gas pipeline 7. Then the gas outlet 5 is closed and disconnected, and the closed pressure vessel 1 is relocated to the afterheating unit 3 heated up to higher temperature, maximum 550° C. Here it is also placed into the bed 9 and its gas outlet 2 is connected to the gas pipeline 7. The gas outlet 5 is opened and the pressure vessel 1 is allowed to afterheat with the help of auxiliary heating elements 10, maximally for 180 minutes however. In this afterheating unit 3, direct warming-up of the liquid heat carrier 8 by the heating element 10 in the form of electric spiral placed directly in the liquid heat carrier 8 takes place, and also indirect warming-up occurs by heat transfer from the heated ring 11 to the pressure vessel 1 and from here via the bottom of the pressure vessel 1 and through that part of the wall of the bed 9 that is adjacent to the bottom of the pressure vessel 1. Also during the time period of afterheating of the pressure vessels 1, pressure in the connected gas pipeline 7 is maintained at 2 to 5 kPa, and the gas mixture generated in the pressure vessel 1 is drawn off through the gas pipeline 7.

The gases resulting from the charge are allowed to be freely released during preheating as well as during afterheating of the pressure vessels 1, and at least the gases released from the pressure vessels 1 in the stage of afterheating are led out to the cooler 17, where they are cooled to a temperature of maximally 60° C., during which the oily condensate is separated. Uncondensed residual gas mixture is led out from the cooler 17 separately from condensate and is collected in a storage space of gas tanks 19 on the gas pipeline 7 path. The gas tank 19 with the volume equal to four to six times the inner volume of the pressure vessel 1 is inserted as the first one in the device circuit. Into it, the gases led from the cooler 17 are purposefully collected and are allowed to mix freely. The composition of these gases varies with time, because in the course of heating of each individual pressure vessel 1, different gas fractions are released from it by thermal reaction, depending on the actual temperature. Increase of concentration of contained gases as well as significant unification of their material composition is achieved by collecting gases from higher number of pressure vessels 1 being, as the case may be, in different stages of heating into one or more gas tanks 19, and that for longer period of time. The incoming gas mixture is collected in the selected gas tank 19 and allowed to mix freely for at least 10 minutes without further heating. Then, provided that the contents of combustible components in the collected gas mixture amounts already to at least 20% vol. and a minimal heating value of at least 10 MJ/m$^3$ is reached, the gas mixture is led out of the gas tank 19. The gas mixture is maintained at the pressure of 2 to 5 kPa in the course of this collection and outlet. The gas mixture utilisable for various purposes, in particular as fuel, is produced already in this phase of the process. Thus the gas mixture produced can be transferred to small detachable pressure tanks 19 into which it is compressed to the pressure from 2 kPa to 20 000 kPa and in this state removed from the circuit of the device and kept for the needs of sale or as a reserve for the cogeneration unit 20 for example in the time of service outage of part of the device during maintenance etc., or for other use. Alternatively or additionally it is led under a pressure of 2 to 5 kPa for burning as fuel for the cogeneration unit 20, as shown on FIG. 1.

The pressure vessels 1 are heated stepwise, one or several at once, and after removal of one pressure vessel 1, another pressure vessel 1 is placed to its place. During this time period, the heated up state of the preheating unit 2 as well as the afterheating unit 3 is maintained. Thy system of filled pressure vessels 1 is processed stepwise. At least some of them are heated stepwise in succession in the same bed 9 so that the removed pressure vessels 1 are replaced with other pressure vessels 1 with temperature and contents corresponding to the relevant step of the procedure. The heated up and used up pressure vessels 1 are returned from the afterheating unit 3 back to the preheating unit 2 to transmit its heat here before removal from the device so that the heat is utilised for the thermal regime of the device. Here, they are transferring their heat back by heating the liquid heat carrier 8. Thereafter, when further dwell of the pressure vessels 1 in the preheating unit 2 is no longer economic, the used up pressure vessels 1 are disassembled and the solid charred residue is poured out from them. This is utilisable as a high-quality solid carbonaceous fuel. Emptied and used up pressure vessels 1 can be refilled and the whole cycle of the individual charge processing can be repeated.

The way in which power economy is performed in the thermal regime of the device is very rewarding. The temperature of the liquid heat carrier 8 in the preheating unit 2 and the temperature of the liquid heat carrier 8 in the afterheating unit 3 are very effectively controlled by means of circulation. During circulation, the liquid heat carrier 8 of both heated units 2,3 is temporarily interconnected and the liquid heat carrier 8 is allowed to circulate in a controlled way from one heated unit 2,3 to the other one and back, while temperature is measured and the flow quantity and flow rate through this circulation circuit are controlled as needed.

Using of combination of a step-by-step operation of charge, when the pressure vessels 1 are placed into the beds 9 additionally and/or alternatively in time, with continuous drawing off of all generated gases and condensate is highly effective. The process of thermal processing of the charge is done in such quantity of pressure vessels 1 and so long till the set quantity of the gas mixture is produced. If the heat exchanger 15 is connected to the liquid heat carrier 8, the liquid heat carrier 8 is allowed to flow at least temporarily also through this heat exchanger 15 as at least one of its work media, while the temperature of some of the media in the device is controlled using the gained or diverted heat so that the medium controlled in this way is led through this heat exchanger 15 as its second work medium. The heat exchanger 15 can be connected externally to some of the heated units 2,3 or it can be inside. It can be preferably used for regulation of for example temperature of the oily condensate. The gas mixture produced can be compressed to the pressure of 2 kPa up to 20 000 kPa and in this state stored for further utilisation, and/or it is under the pressure of 2 to 5 kPa led out to be burned as a fuel, for example for a cogeneration unit 20.

The invention claimed is:

1. Method of producing fuel for energetics in which a carbonaceous material is processed by means of thermal decomposition without the presence of flame, wherein the method comprises:
   placing a charge of material into a cavity inside a mobile container, wherein the mobile container is a pressure vessel (1) with a gas outlet (5);
   closing the mobile container after insertion of the charge and placing the mobile container into a preheating unit (2);
   connecting the gas outlet (5) to a gas pipeline (7);
   exhausting present air with contingent gases from the pressure vessel (1) through the gas outlet (5) such that the pressure in the pressure vessel (1) is decreased to 2 to 5 kPa;
   preheating the pressure vessel (1) in the state connected to the gas pipeline (7) to a temperature of 90 to 120° C., wherein this preheating is done within 60 to 120 minutes and during this time period, pressure in the connected gas pipeline (7) is maintained at 2 to 5 kPa;
   drawing off a gas mixture released by thermal decomposition of the charge in the pressure vessel (1) through the gas pipeline (7), wherein a solid residue remains in the mobile container;
   closing and disconnecting the gas outlet (5),
   relocating the pressure vessel (1) in closed state to an afterheating unit (3);
   reconnecting the gas outlet (5) to the gas pipeline (7) and opening the gas outlet (5);
   heating the pressure vessel (1) in the afterheating unit (3) to a higher temperature, but not higher than 550° C., for a time up to 180 minutes, while during this time period, pressure in the connected gas pipeline (7) is maintained at 2 to 5 kPa and the gas mixture generated in the pressure vessel (1) is drawn off through this gas pipeline (7).

2. Method of producing fuel for energetics according to claim 1 characterized by that the gases evolving from the charge are allowed to be freely released during preheating as well as during afterheating of the pressure vessel (1), and at least the gases released in the stage of afterheating of the pressure vessel (1) are led out to a cooler (17), where they are cooled to a temperature of maximally 60 ° C., during which separated oily condensate is isolated and uncondensed gas mixture is led out and subsequently, on the gas pipeline (7) path, uncondensed gas mixture with various fractions from thermal processing of the charge is collected in a storage space (19) of a volume equal to four to six times the inner volume of the pressure vessel (1), where it is mixed for at least 10 minutes without further heating and then, provided that the contents of combustible components in the collected gas mixture amounts to at least 20% vol. and a minimal heating value of at least 10 MJ/m3 is reached, the gas mixture is led out of the storage space, while the gas mixture is maintained at the pressure of 2 to 5 kPa also during collection and outlet.

3. Method of producing fuel for energetics according to claim 1 characterized by that heated up spaces of heated units, including the preheating unit (2) and the afterheating unit (3), are maintained continually in heated up state and the charge is put into at least two pressure vessels (1) and these are heated stepwise, so that after removal of one pressure vessel (1), another pressure vessel (1) is placed in the heated up space of the heated unit.

4. Method of producing fuel for energetics according to claim 3 characterized by that the charge is put into a system of more than two pressure vessels (1), at least some of which are heated stepwise so that the removed pressure vessels (1) are replaced with other pressure vessels (1) with temperature and contents corresponding to the relevant step of the method.

5. Method of producing fuel for energetics according to claim 3 characterized by that a liquid heat carrier (8), with which a space surrounding the pressure vessels (1) during heating is at least partially filled, is used for heating of the pressure vessel (1), while in the case of afterheating, the pressure vessel (1) is additionally heated with the help of at least one additional heat source functioning on a different principle of heating.

6. Method of producing fuel for energetics according to claim 5 characterized by that the liquid heat carrier (8) preheating the pressure vessel (1) is at least temporarily interconnected with the liquid heat carrier (8) afterheating other pressure vessel (1) at a different place to a higher temperature, so that using the said interconnection, a circulation circuit for circulation of the liquid heat carrier (8) from a place for preheating to a place for afterheating is created and the liquid heat carrier (8) is allowed to circulate at least temporarily through this circuit during heat treatment of the charge, while the flow rate through this circulation circuit is controlled as needed.

7. Method of producing fuel for energetics according to claim 6 characterized by that after an amount of generated gas mixture is drawn off the pressure vessel (1), the gas outlet (5) of the afterheated pressure vessel (1) is closed, disconnected, and the pressure vessel (1) is relocated from the place for afterheating, that is from the afterheating unit (3), again to the place for preheating, that is into the preheating unit (2), where it is allowed to transfer heat back to the liquid heat carrier (8) for economic time period.

8. Method of producing fuel for energetics according to claim 5 characterized by that at least one pressure vessel (1) is placed into the liquid heat carrier (8) and next pressure vessels (1) are stepwise additionally and/or alternatively placed here, while the generated gases are continuously drawn off.

9. Method of producing fuel for energetics according to claim 8 characterized by that the liquid heat carrier (8) used for heating of the pressure vessels (1) is a liquid based on oil, which is heated up to a temperature of 120 to 300 ° C. and the temperature of the liquid is held in this temperature range for the period of continuous drawing off of the generated gases from the pressure vessels (1).

10. Method of producing fuel for energetics according to claim 8 characterized by that at least one heat exchanger (15) is associated with the liquid heat carrier (8) and the liquid heat carrier (8) is allowed to flow at least temporarily through this heat exchanger (15) as at least one work media of the heat exchanger (15), while the temperature of some of the media contained in the device is controlled using the heat gained or diverted from the liquid heat carrier (8) by this heat exchanger (15), so that the medium controlled in this way is led through this heat exchanger (15) as a second work medium of the heat exchanger (15).

11. Method of producing fuel for energetics according to claim 1 characterized by that the gas mixture produced is compressed to a pressure of 2 kPa up to 20 000 kPa and in this state stored for further use, and/or it is under the pressure of 2 to 5 kPa led out to be burned as a fuel.

\* \* \* \* \*